United States Patent [19]

Chan

[11] Patent Number: 4,667,257
[45] Date of Patent: May 19, 1987

[54] DISK DRIVE AND CENTERING MECHANISM FOR MICROFLOPPY DISK DRIVE

[75] Inventor: John R. Chan, Fremont, Calif.

[73] Assignee: Chan Industries, Inc., Santa Clara, Calif.

[21] Appl. No.: 799,138

[22] Filed: Nov. 18, 1985

[51] Int. Cl.[4] .................... G11B 5/016; G11B 23/02
[52] U.S. Cl. .................................. 360/99; 360/133; 360/135
[58] Field of Search .......................... 360/97–99, 360/133, 135

[56] References Cited

U.S. PATENT DOCUMENTS 4,497,003 1/1985 Abe et al. .............................. 360/97
4,581,669 4/1986 Tsuji et al. ............................ 360/97

FOREIGN PATENT DOCUMENTS 2082371A 3/1982 United Kingdom ................ 360/133

Primary Examiner—John H. Wolff
Attorney, Agent, or Firm—Claude A. S. Hamrick

[57] ABSTRACT

An improved disk drive and centering mechanism for attachment to the spindle of a microfloppy drive, including a first circular segmented plate attached to a second circular segmented plate by four parallel spring wires. The first plate is fixedly attached to the drive spindle and the second plate is resiliently carried by the four spring wires. A drive pin is carried by the second plate, and the four parallel wires limit the motion of the drive pin and the second plate to vertical and horizontal displacement relative to the first plate and thereby prevent any tilting of the vertical axis of the drive pin.

8 Claims, 10 Drawing Figures

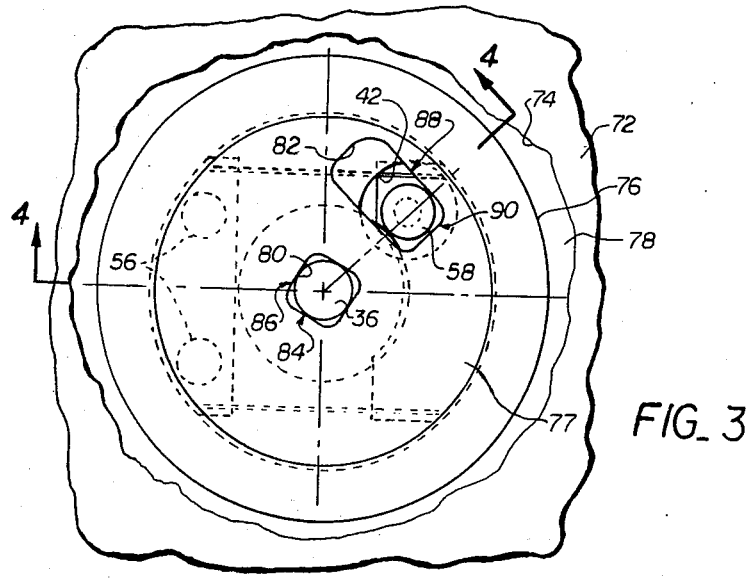
FIG_3
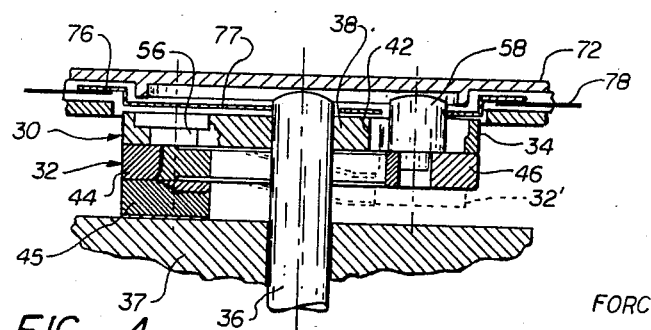
FIG_4
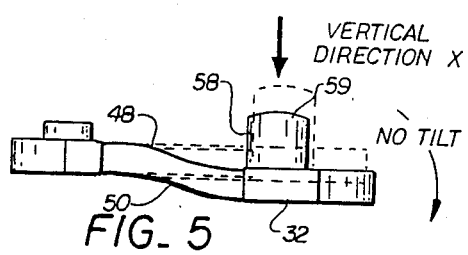
FIG_5
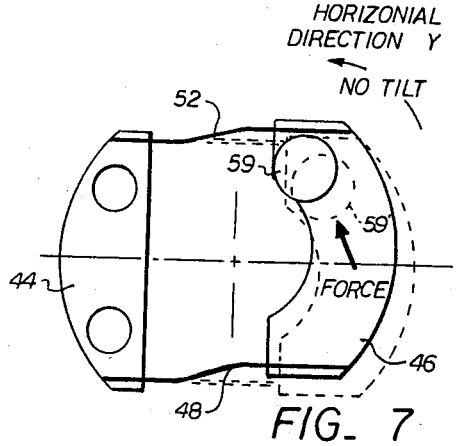
FIG_7
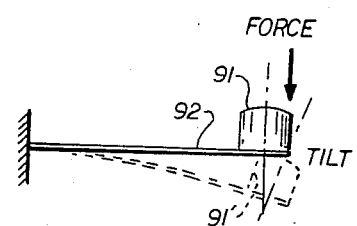
FIG_6 PRIOR ART

DISK DRIVE AND CENTERING MECHANISM FOR MICROFLOPPY DISK DRIVE

BACKGROUND OF THE INVENTION

1. Field of the Invention

The present invention relates generally to magnetic disk drive apparatus and more particularly to an improved disk drive and centering mechanism for use in microfloppy disk drives.

2. Background of the Present Invention

Microfloppy disk drives of the type in which the present invention has particular application are disclosed in U.S. Pat. No. 4,581,669 (which corresponds to U.K. Patent Application GB-2082371A published Mar. 3, 1982); such patent is hereby incorporated by reference. Prior art drives of the type disclosed therein include a driving mechanism for engaging and rotating the magnetic disk contained in a microfloppy cassette. Such mechanism includes a means for centering the media within the cassette envelope so that it is free to properly rotate therewithin. Whereas initial engagement between the drive spindle and media hub is by attractive force exerted by small magnets located in the spindle hub, centering of the media and operational drive thereof is accomplished by means of an offset drive pin or roller mounted on a flexure which penetrates and acts on one side of an eccentrically positioned rectangular slot formed in the media hub. The pin and flexure are configured such that there is interference between the pin and the rectangular slot in the media hub so that during engagement, one side of the central opening in the media hub is moved into contact with and then held in firm contact with one side of the spindle shaft. In existing drive pin designs, the drive pin is supported in cantilever fashion by the flexure and tends to tilt slightly both when it is engaged and depressed by the media hub. and when it is used to drive the hub. This tilting is likely to cause pin misengagement or disk miscentering and in some cases may result in disengagement between the drive spindle and the media hub.

SUMMARY OF THE PRESENT INVENTION

It is therefore a principle objective of the present invention to provide an improved disk drive and centering pin suspension mechanism for use in microfloppy disk drives and the like.

A further objective of the present invention, is to provide a drive and centering pin suspension means which maintains the axis of the drive and centering pin in an orientation which is parallel to its orientation at rest during deflection of the pin suspension.

Briefly, a preferred embodiment of the present invention includes a first circular segmented plate which is attached to a second circular segmented plate by four parallel spring wires. The first plate is fixedly attached to the drive spindle hub and the second plate is resiliently carried by the four spring wires. A drive pin is carried by the second plate, and the four parallel wires allow the drive pin and second plate to experience both vertical and horizontal displacement without tilt.

An important advantage of the present invention is that a more reliable and accurate centering and driving engagement is provided between spindle and media.

Another advantage of the present invention is that it allows substantial translational pin motion in two orthogonal directions without permitting pin tilt in either direction.

These and other objects and advantages of the present invention will no doubt become apparent to those skilled in the art after having read the following detailed description of the preferred imbodiment which is illustrated in the several figures of the drawing.

IN THE DRAWING

FIG. 2b is a side elevational view of the mechanism of FIG. 2a;

FIG. 3 is a broken partial plan view illustrating engagement of a microfloppy disk media with the disk drive and centering mechanism of the present invention;

FIG. 4 is a partially broken cross sectional view taken along the line 4—4 of FIG. 3;

FIGS. 5 and 6 are respectively, side elevational views illustrating operation in the vertical mode of the drive and centering mechanism of the present invention and that of the prior art; and FIG. 7 is a plan view illustrating operation of the present invention in the horizontal mode.

DETAILED DESCRIPTION OF THE PREFERRED EMBODIMENT

Figure 1:
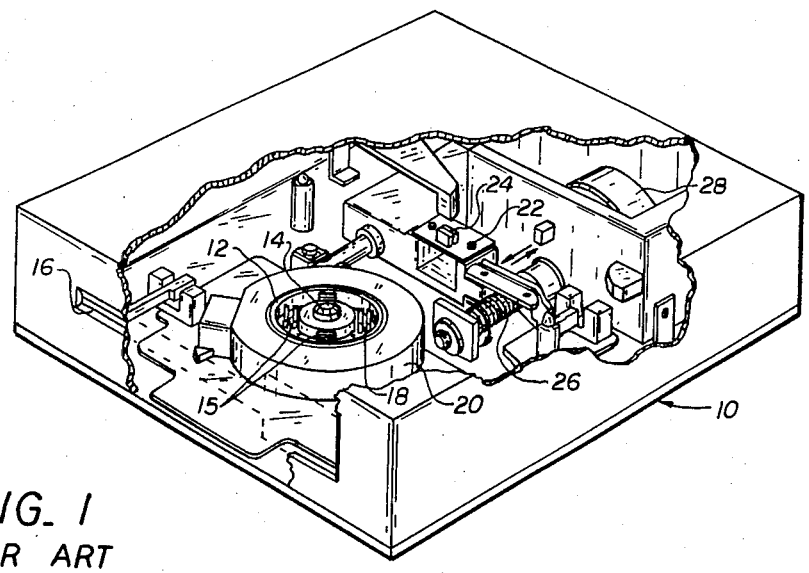
FIG. 1 is a broken perspective view illustrating the princile internal components of a prior art microfloppy disk drive unit.

In FIG. 1 of the drawing, a partially broken illustration of a typical prior art microfloppy disk drive is depicted at 10. The essential components of the drive 10 are the media hub engaging spindle 12 mounted to the spindle shaft 14 for a receiving and drivably engaging the media hub of a microfloppy diskette (not shown) inserted into the device through a frontal opening 16. The drive and centering pin of the mechanism is shown at 18. Disposed immediately behind the spindle drive motor 20 is a carriage mechanism 22 for transporting the magnetic read/write head 24. Carriage 22 is driven via a lead screw 26 by a stepper motor 28. Further detail and discussion of operation of the drive 10 may be found in the above-identified U.S. Patent.

A cassette inserted into the opening 16 will be positioned so that the central opening in the media hub is aligned with the spindle shaft 14. In such position the magnets 15 carried by the spindle 12 will draw the media hub into frictional engagement therewith. As this occurs, the hub will depress pin 18. Spindle 12 is then rotated by the motor 20. Even though there is frictional engagement between the spindle and hub, it is not sufficient to prevent slippage therebetween, and as a consequence pin 18 will be rotated into alignment with an eccentrically positioned opening in the hub and will enter same to perform the dual purposes of centering and providing positive drive to the recording media. The present invention provides an improved means for supporting and biasing a pin such as that shown at 18.

Figure 2:
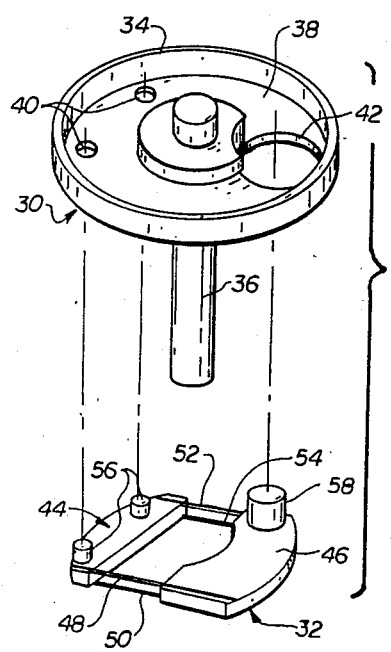
FIG. 2 is an exploded perspective view showing a disk centering and drive mechanism in accordance with the present invention.

Referring now to FIG. 2 of the drawing, a spindle 30 and associated media drive and centering mechanism 32 in accordance with the present invention will be described in detail while making additional reference to FIGS. 2a-2c. As illustrated, the spindle 30 includes an upstanding annular lip 34 which is affixed to the shaft 36 by a web 38 that is provided with a pair of locator pin receiving apertures 40 and a drive pin receiving aperture 42 of larger diameter. Although not shown, it will be understood that as in the prior art spindles depicted in FIG. 1, the spindle 30 will also be provided with several permanent magnets that will be affixed to the surface of web 38. Displaced beneath spindle 30 and shown in exploded relationship thereto is the media drive and centering mechanism 32 which includes first and second plates 44 and 46 respectively, that are affixed together by means of four spring wires 48–54. Note that the outer perimeters of plates 44 and 46 are in the form of segments of a circle concentric with the axis of shaft 36. Affixed to the top of plate 44 are a pair of locator pins 56 which are adapted to engage the apertures 40 in spindle 30 and, as will be further described below, assist in securing plate 44 to spindle 30. The pins 56 may be either molded integrally with plate 44 or affixed thereto by any suitable means.

Figure 2A:
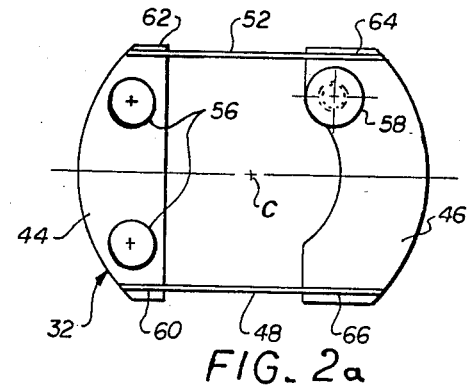
FIG. 2a is a top plan view of the mechanism shown in FIG. 2.
Figure 2B:
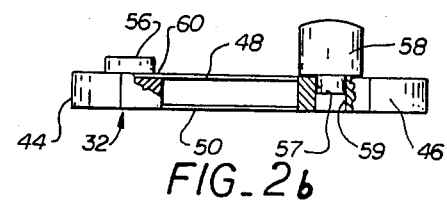
Figure 2C:
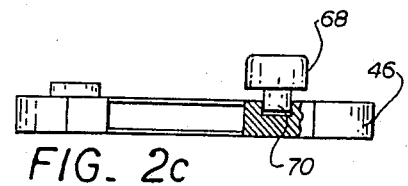
FIG. 2c is a side elevational view of an alternative embodiment of the mechanism.

In FIGS. 2a and 2b, it will be noted that slots 60–66 are provided in the upper and lower surfaces of plates 44 and 46 for receiving the end portions of wires 48–54. Attachment of the end portions of the wires may be made by any suitable means including press fitting, adhesive bonding, welding, clamping, insert molding, etc. Although the means of attachment is not critical, it is important that the entire seated portion of each wire be firmly secured within its corresponding slot so as to ensure that the operational relationship between each wire and the attached plates is substantially identical.

The drive and centering pin 58 is also affixed to plate 46 by any suitable means. As illustrated in FIG. 2b, a portion 57 of reduced diameter is threaded into, or press fit into, a bore 59 in plate 46. An alternative to the use of a fixed pin is shown in FIG. 2c wherein a roller or bearing 68 journalled to a shaft 70 is utilized. In this embodiment. Shaft 70 is likewise affixed to plate 46 in any suitable manner. An important characteristic of pin 58 (or roller or bearing 68) is that the distance between the centerpoint C of the mechanism 32 and the outermost point O on the circumference of pin 58 have a predetermined relationship to the centering and drive aperture of the media hub, as will be further described below.

Referring now to FIG. 3 of the drawing, a segment of the central portion of the microfloppy diskette is shown at 72. The segment is further broken at 74 to reveal the media hub 76 and a portion of the attached magnetic media 78. As shown more clearly in FIG. 4, hub 76 includes a recessed central portion 77 having a central aperture 80 formed therein for receiving the spindle shaft 36, and a rectangularly shaped, eccentrically disposed second aperture 82 for receiving pin 58. According to industry standard, the aperture 80 is made generally square in configuration and is dimensioned so that its sides are somewhat larger than the diameter of shaft 36. In addition, aperture 80 is displaced a predetermined distance off-center in the direction of the driving and centering aperture 82. The long dimension of the rectangular aperture 82 extends along an off-centered portion of a cord line of the circular hub 76 so that as pin 58 enters the left-most side thereof and engages the edge 88 it will cause the hub 76 to be displaced outwardly in a direction normal to edge 88 until the sides 84 and 86 firmly contact with shaft 36, at which time the spindle and associated media will be centered relative to the axis of the driving spindle.

In FIG. 4 of the drawing, which is a cross-section taken along the line 4—4 of FIG. 3, the assembly of the disk drive and centering mechanism of the present invention relative to the shaft 36, motor armature 37, spindle 30 and diskette 72 is illustrated. As shown, the plate 44 of mechanism 32 is sandwiched between spindle 30 and a spacer 45 affixed to the armature 37 of the drive motor which together with pins 56 act to secure plate 44 to the underside of spindle 30. Although not fully shown, spacer 45 is similar in plan to plate 32. Note that, as indicated by the dashed lines 32', plate 46 and the associated pin 58 are free to move downwardly against the bias of spring wires 48–54 to a position such that the upper end of pin 58 is level with the top surface of spindle 38.

Referring additionally to FIGS. 5, 6 and 7, operation of the present invention will be discussed. As mentioned above, when a diskette is inserted into the drive, it is moved into a position above the spindle 30 and then drawn down into engagement with the spindle. Magnets (not shown) carried on the web 38 (FIG. 2) insure that the hub 76 is pulled into intimate contact with the top of the spindle and into the position shown in FIG. 4. Guides within the drive housing will cause the diskette to be roughly centered relative to shaft 36 so that it will penetrate opening 80. However, since opening 82 will normally be randomly positioned relative to the pin 58, the upper end of pin 58 will be engaged by the bottom surface of the media hub 76 and will be forced downwardly into the position shown in FIG. 4 by the dashed lines 32'. When the drive motor is actuated, the spindle will turn relative to the media hub with the pin 58 being biased upwardly into sliding engagement with the bottom surface of hub 76 by the spring wires 48–52.

The nature of this deflection is additionally illustrated in FIG. 5 of the drawing. Note that because of the parallel action of the wires 48–54, in response to the downward force applied to the top 59 of pin 58, plate 32 will be translated downwardly and inwardly, with pin 58 experiencing no tilt. This motion is to be contrasted to the tilting motion experienced by prior art pins 91 which, as illustrated in FIG. 6, are supported by a cantilevered spring element 92. Note that in the case of the prior art structure, upon experiencing a downward force, the outer extremity of pin 91 moves outwardly from its rest position, whereas in the case of the present invention, the pin 58 moves inwardly as it moves downwardly. The non-tilting motion of the present invention during vertical motion of pin 58 is preferable to the tilting motion of the prior art in that in penetrating the aperture 82, there is little likelihood that the top surface 59 (FIG. 5) of pin 58 will engage the outer edge 88 (FIG. 3) as it penetrates opening 82. However, in accordance with the prior art there is a possibility that if the pin 91 is moving fast enough relative to the media hub, the top surface of pin 91 may engage the outer edge of the opening 82. In such case, it is likely that pin 91 will not completely enter the aperture and may cam out of engagement therewith, and perhaps in an extreme case, even skip out of engagement with the hub aperture.

Turning now to FIG. 7, it will be appreciated that once pin 59 has entered aperture 82, and engaged edge 88 (FIG. 3) and edge 90, it will experience a horizontal loading force tending to deflect the pin and its carrying plate 46 laterally relative to its rest position. Since motion of plate 46 in this direction is also controlled by the four spring wires 48-52, such motion will likewise be a translational motion rather than a rotational motion, and as a consequence, pin 59 will again be restrained against tilting. Since the biasing forces resisting the translation have horizontal components in both the outward radial direction and the tangential direction of drive, positive centering and drive engagement is uniformly maintained. It will thus be appreciated that the forces tending to prevent tilting of the centering and driving pin 59 substantially improve its operational relationship relative with the media hub to be engaged, centered and driven.

Whereas the present invention has been described above with regard to a particular preferred embodiment, it will be appreciated that after having read the preceding disclosure it is likely that alterations and modifications will become apparent to those skilled in the art. It is therefore intended that the following claims be interpreted as covering all such alterations and modifications as fall within the true spirit and scope of the invention.

What is claimed is:

1. In a microfloppy disk drive including means for receiving a microfloppy diskette having a media carrying hub with a central aperture and an elongated, eccentrically disposed centering and driving aperture formed therein, a motor driven spindle attached to a shaft the distal end of which mates with the central aperture of a media hub, a media drive and centering mechanism carried by said spindle for mating with the hub and engaging such apertures to center and drive the hub carried media, and magnetic read/write head means to read and write magnetic signals to the driven media, an improved media drive and centering mechanism comprising:
   a first plate for rigid attachment to said spindle;
   a second plate having a media hub engaging drive and centering pin means extending upwardly therefrom for mating with said eccentrically disposed centering and driving aperture; and
   resilient means coupling said second plate to said first plate and having the characteristic of limiting the motion of said second plate to translation in two orthogonally related directions in response to the application of vertical and horizontal forces to said drive and centering pin means while at the same time preventing any tilting of the vertical axis of said pin means.

2. In a microfloppy disk drive or the like as recited in claim 1 wherein said resilient means is comprised of at least two elongated resilient members disposed in spaced apart parallel relationship to each other.

3. In a microfloppy disk drive or the like as recited in claim 1 wherein said resilient means includes four elongated resilient members disposed in spaced apart parallel relationship to each other.

4. In a microfloppy disk drive or the like as recited in claim 3 wherein said elongated resilient members are lengths of spring wire rigidly affixed to corresponding portions of the top and bottom surfaces of said first and second plates.

5. An improved spindle and disk drive and centering mechanism assembly for microfloppy drives, comprising:
   a media hub engaging spindle affixed to the drive shaft of a media drive motor means, said spindle having an eccentrically located pin receiving aperture formed therein;
   a first plate for rigid attachment to the bottom of said spindle;
   a second plate disposed beneath said spindle and having a media hub engaging drive and centering pin means rigidly affixed thereto and extending vertically upwardly therefrom and through said aperture; and
   resilient means coupling said second plate to said first plate and having the characteristic of limiting the motion of said second plate to translation in vertical and horizontal directions in response to the application of hub engaging forces to said drive and centering pin means and thereby preventing any tilting of the vertical axis of said pin means.

6. An improved spindle means as recited in claim 5 wherein said resilient means is comprised of at least two elongated resilient members disposed in spaced apart parallel relationship to each other.

7. An improved spindle means as recited in claim 5 wherein said resilient means includes four elongated resilient members disposed in spaced apart parallel relationship to each other.

8. An improved spindle means as recited in claim 7 wherein said elongated resilient members are lengths of spring wire rigidly affixed to corresponding portions of the top and bottom surfaces of said first and second plates.

* * * * *